United States Patent [19]

Abe et al.

[11] Patent Number: 4,648,828
[45] Date of Patent: Mar. 10, 1987

[54] CRUDE MATERIAL FORMING MACHINE

[75] Inventors: Kazuo Abe, Fukuoka; Akira Shimamura, Kokubunji, both of Japan

[73] Assignee: Nisshin-Dca Foods Inc., Tokyo, Japan

[21] Appl. No.: 753,898

[22] Filed: Jul. 11, 1985

[30] Foreign Application Priority Data

Jul. 19, 1984 [JP] Japan .................. 59-109126
Dec. 24, 1984 [JP] Japan .................. 59-272173

[51] Int. Cl.⁴ .............................................. A21C 11/16
[52] U.S. Cl. .................. 425/288; 425/131.1; 264/171
[58] Field of Search ............. 264/73, 75; 425/287, 425/288, 130, 131.1

[56] References Cited

U.S. PATENT DOCUMENTS

| | | | |
|---|---|---|---|
| 498,142 | 5/1893 | Thoens | 425/321 |
| 1,477,094 | 12/1923 | Wilson | 264/171 |
| 1,947,541 | 2/1934 | Wengel | 425/131.1 |
| 2,138,378 | 11/1938 | Johnson | 425/131 |
| 2,143,353 | 1/1939 | Korpan | 425/287 |
| 2,174,779 | 10/1939 | Delorme | 264/75 |
| 2,428,046 | 9/1947 | Sisson et al. | 264/171 |
| 2,635,560 | 4/1953 | Coyne | 425/288 |
| 2,962,810 | 12/1960 | Gilmore | 425/287 |
| 3,196,809 | 7/1965 | Nelson et al. | 425/131.1 |
| 3,314,381 | 4/1967 | Fries et al. | 425/131.1 |
| 3,344,751 | 10/1967 | Cammack et al. | 425/382 R |
| 3,382,534 | 5/1968 | Veazey | 264/171 |
| 3,779,676 | 12/1973 | Bernard | 425/131.1 |
| 3,807,919 | 4/1974 | Kaufman, Jr. et al. | 425/288 |
| 4,460,649 | 7/1984 | Park et al. | 264/147 |
| 4,528,900 | 7/1985 | Simelunas | 425/133.1 |

Primary Examiner—Tim Miles
Attorney, Agent, or Firm—Larson & Taylor

[57] ABSTRACT

Disclosed is a machine for forming viscous fluid crude material such as dough or fish-paste into a ring shape or the like. The machine has a cutter device provided with a vertical passage and cutter means arranged at the lower opening of the passage. The crude material is forcely introduced into the passage through its upper opening and extruded from its lower opening. The extruded crude material is cut off by means of the cutter means. Moreover, the passage is partitioned at least in its upper portion into a plurality of sector-shaped sections by means of a separator. Accordingly, the formed crude material can be sectioned into a plurality of portions of different tastes and/or colors.

1 Claim, 8 Drawing Figures

CRUDE MATERIAL FORMING MACHINE

TECHNICAL FIELD

This invention relates to a machine for forming viscous fluid crude material such as dough or fish-paste into a ring shape or the like.

BACKGROUND OF THE INVENTION

Such a crude material forming machine is previously known which has a crude material tank and a cutter device. The cutter device has a guide cylinder with an upper opening and a lower opening, and the upper opening is connected to a lower end opening of the tank. The upper opening communicates with the lower opening through a passage formed in the guide cylinder. The crude material in the tank is forcely introduced into the passage through the upper opening and extruded from the lower opening of the guide cylinder. The cutter device has, moreover, cutter means arranged at the lower opening of the guide cylinder, and the extruded crude material is cut off by means of the cutter means. The cutter means is, for example, composed of a disc positioned below the lower opening and a cutter sleeve mounted slidable on the guide cylinder. The extruded crude material is deflected in a circular shape radially outward along the upper surface of the disc, and, when the cutter sleeve is moved downward and the lower edge of this sleeve is engaged closely with the outer periphery edge of the disc, the deflected crude material is cut off into a ring shape (if the disc has an upwardly extending rod from its center) or a circular shape. Thus a mass of crude material having a special shape is obtained. Thereafter, for example, the mass is fried to produce a ring-shaped doughnut if the crude material is dough, or the mass is steamed to produce a "Kamaboko" if the crude material is fish-paste.

However, tastes of the demanders are recently variegated, even foodstuffs tend to follow the fashion at present, and even annular doughnuts, "Kamaboko" and the like should be desirably varied in appearance and/or taste.

In the conventional crude material forming machine, the taste of the crude material such as dough or fish-paste can be adjusted, but the machine cannot produce a variety by dividing the mass of crude material into a plurality of sections of various taste and/or colors, and has a limitation in variation of taste and/or color.

SUMMARY OF THE INVENTION

Accordingly, it is an object of the invention to provide a crude material forming machine for forming crude material into a mass sectioned into two or more sections of different tastes and/or colors.

To achieve the object, according to the invention, the passage in the cutter device included in the crude material forming machine is partitioned at least in its upper portion into a plurality of sector-shaped sections by means of a separator.

According to one embodiment of the invention, the machine has a crude material tank with a lower end opening connected to the upper opening of the cutter device, and the separator extends into the tank.

According to another embodiment of the invention, the machine has at least two crude material tanks provided with a lower end opening each, and a distributor including a plurality of distributing passages, each of said distributing passages causing one of the lower end openings of the tanks to communicate with selected one or ones of the upper ends of the sector-shaped sections.

In this embodiment, it is preferable that the distributor comprises an upper plate having a plurality of openings opposed to the lower end openings of the tanks, a lower plate having a plurality of openings opposed to the upper ends of the sector-shaped sections, and a passage forming unit between the upper and lower plates, said unit having a plurality of holes, each of the openings in the upper plate being connected to selected one or ones of the openings in the lower plate through selected one or ones of the holes in the unit.

BRIEF DESCRIPTION OF THE DRAWINGS

The above and other objects, features and advantages of the present invention will become more readily apparent from the following description, reference being made to the accompanying drawings in which.

DETAILED DESCRIPTION OF THE PREFERRED EMBODIMENTS

Figure 1:
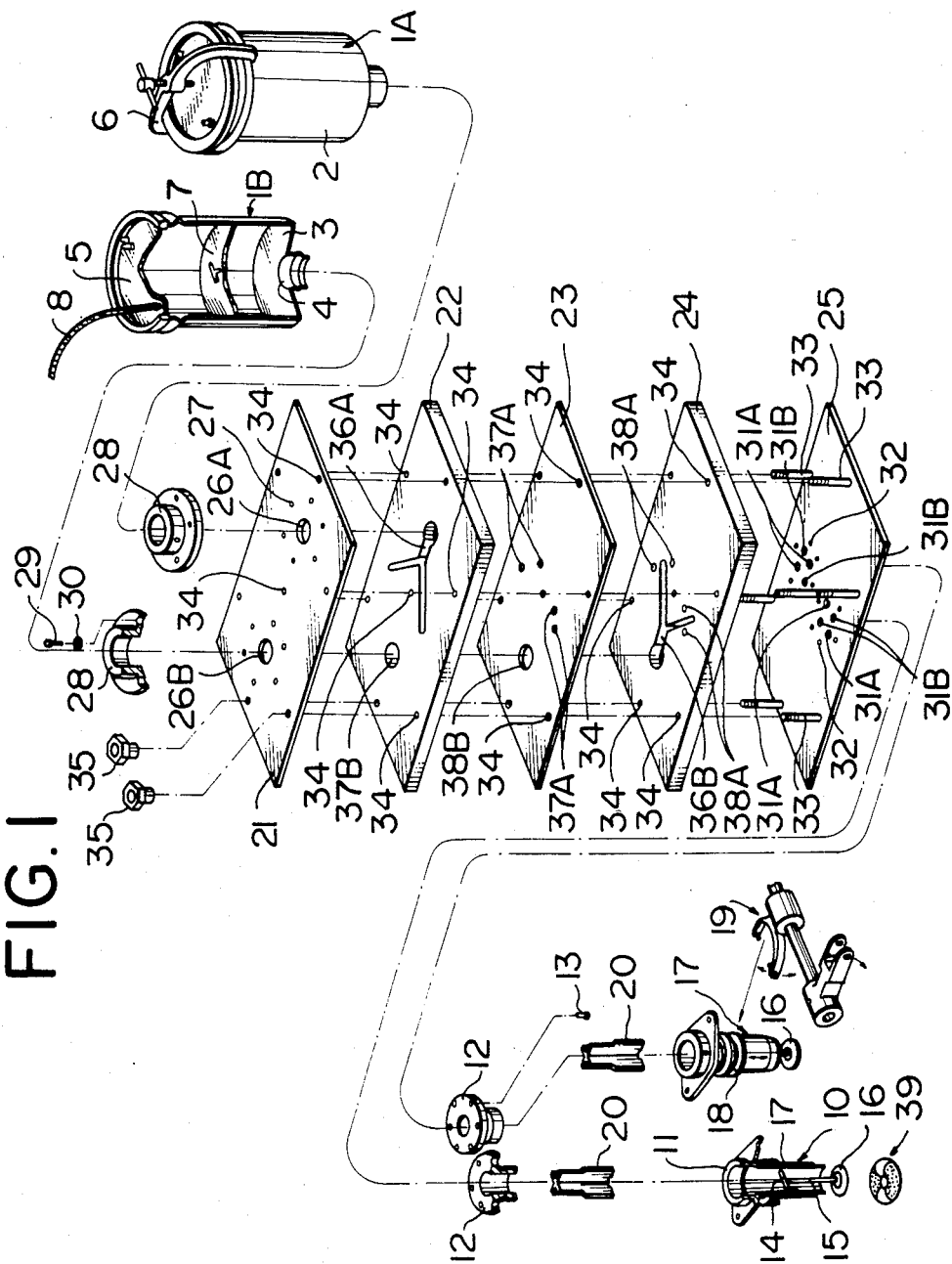
FIG. 1 is an exploded perspective view of one embodiment of the crude material forming machine according to the invention.

FIG. 1 is an exploded view of components of a crude material forming machine as an embodiment of the present invention, in which view the right side shows crude material tanks, the center shows a crude material distributor, and the left side shows a cutter device.

The construction of the crude material tank 1 is known, in which a bottomed round body 2 has a crude material outputting downward hole 4 arranged at the center of a bottom plate 3, and a pressure cover 5 can forcely seal the body by a cover clamp 6. Numeral 7 designates a dropping cover, and numeral 8 designates a pipe for inputting pressure air.

Crude materials of different types are stored in two tanks 1. In the following description, the two tanks are distinctively designated by 1A, 1B.

A cutter device 10 will be now described in detail. This cutter device 10 is known except that a separator composed of partition plates are included. A cutter nozzle 11 constituted as a guide cylinder with opened upper and lower ends has on its upper side a flange 12 which is clamped fixedly by bolts 13 to the crude material distributor. The nozzle 11 comprises a lateral rod 14 fixedly mounted in the cylinder at the intermediate position between the upper and lower ends of the cylinder, a disc supporting bolt 15 suspended downward along the axial center of the cylinder from the center of the rod 14, and a disc 16 fixedly supported by the lower end of the bolt 15 and arranged to keep a predetermined gap to the lower edge of the nozzle 11.

Numeral 17 designates a cutter sleeve which is mounted on the lower portion of the nozzle 11, and can be vertically moved by a cam mechanism 19.

When the cutter sleeve 17 is moved downward and the lower edge of this sleeve is engaged closely with the outer peripheral edge of the disc 16, the crude material extruded from the lower end opening of the nozzle 11 and deflected in a circular shape radially outward along the upper surface of the disc 16 is cut off. The cut off crude material has a ring shape. Numeral 18 designates a groove formed at the top of the sleeve and engaged operatively with the cam mechanism 19. Numeral 20 designates the separator which is formed as a combination of partition plates 50 coupled as to form a cross shape. The separator 20 is inserted into the upper half of the nozzle 11 and mounted in a fixed position on the lateral rod 14 for partitioning the interior of the cylinder into four longitudinal passages of $\frac{1}{4}$ circle. The cutter device 10 may further has an auxiliary separator as indicated by a numeral 220 in FIGS. 5 and 6, these auxiliary separator being arranged on the upper surface of the disk 16.

The crude material distributor will be now described in detail. The distributor of this embodiment has an upper horizontal plate 21 and a lower horizontal plate 25, and also has an upper crude material distributing plate 22, a shielding plate 23, and a lower distributing plate 24 arranged in three layers between the upper and lower horizontal plates 21 and 25, the plates 22, 23 and 24 forming a distributing passage forming unit.

Each of the crude material tanks 1A, 1B are mounted fixedly through a tank mounting flange 28 on the upper surface of the plate 21, and upper openings 26A, 26B are so formed in the plate 21 as to oppose to the crude material outputting holes 4 of the crude material tanks respectively. Numerals 27, 27, . . . designate threaded holes arranged about each of the upper openings and engaged with clamping bolt 29 for the flange 28, and numeral 30 designates a washer.

Each of two cutter devices 10 are mounted fixedly through the cutter mounting flange 12 on the lower surface of the plate 25, and four lower openings 31A, 31A, 31B, 31B are so formed in the plate 25 as to oppose to the upper openings of the four longitudinal passages formed by the separator 20 in each nozzle 11. Numeral 32 designates a threaded hole arranged about one of the lower openings and engaged with the clamping bolt 13 for the flange 12. Numerals 33, 33, . . . designate erected six and one bolts respectively implanted near the peripheral edge and at the center on the horizontal plate 25. Bolt holes 34 are respectively formed in the plates 21, 22, 23, 24 so as to align with the bolts 33, and the plates 21, 22, 23, 24, 25 are put one on another while engaging the holes 34 with the bolts 33 of the plate 25, and clamped with nuts 35 engaged with the bolts 33 so as to be fixed to each other.

Distributing passages for cooperatively connecting the upper openings 26A, 26B in the plate 21 to the lower openings 31A, 31A, 31B, 31B in the plate 25 are formed in the upper crude material distributing plate 22, the shielding plate 23 and the lower crude material distributing plate 24 as follows.

The upper opening 26A connected to the tank 1A faces the end portion of the leg of a slender hole 36A formed Y-shapedly in the plate 22, and two holes 37A, 37A formed in the plate 23 face the end portion of one of both arms of the holes 36A. The hole 37A, 37A are connected to the lower openings 31A, 31A in the plate 25 through holes 38A, 38A disposed at the same positions in the plate 24. Therefore, the crude material A inputted from the tank 1A to the opening 26A reaches the holes 37A, 37A through the holes 36A, and fed from the hole 37A through the hole 38A to the lower opening 31A.

Figure 2:
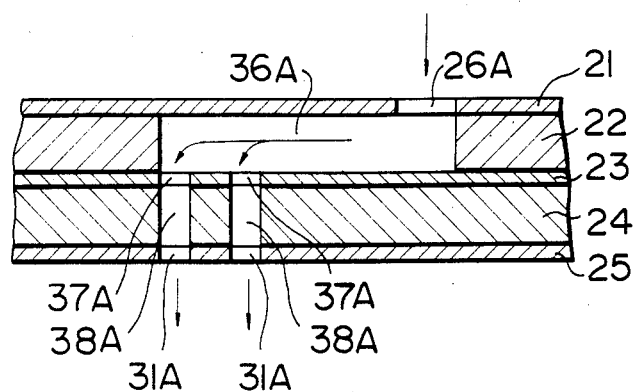
FIG. 2 is a view showing the flow of crude material in the distributor included in the embodiment shown in FIG. 1.

Arrows in FIG. 2 schematically show the flow of the crude material A in the distributor.

On the other hand, the upper opening 26B connected to the tank 1B is connected to the lower openings 31B, 31B, . . . in the same manner through a Y-shaped slender hole 36B formed in the plate 24. Numerals 37B, 38B indicate respectively holes formed in the plates 22, 23 to connect the upper opening 26B to the end portion of the leg of the hole 36B. Therefore, the crude material B inputted from the tank 1B to the opening 26B is fed through the holes 37B, 38B and 36B to the lower openings 31B, 31B along a passage which is entirely different from the passage for the tank 1A.

In the distributor, the distributing passage between the tank 1A and the lower openings 31A, 31A and that between the tank 1B and the openings 31B, 31B are not complicated and do not intersect in a plane, and therefore, even if the crude materials are very viscous, they flow smoothly in the passages without intermixing.

According to the crude material forming machine including the abovementioned crude material distributor, when doughs of butter taste and chocolate taste are, for example, stored respectively in the tanks 1A and 1B, and doughnut-shaped rings are cut off by the cutter device while arbitrarily feeding out the doughs by the air pressure, dough masses in which two types of doughs are alternatively connected as designated by numeral 39 are continuously formed. The formed masses may be then fried in accordance with the ordinary method in order to produce ring-shaped doughnuts.

According to the forming machine as described above, one crude material tank is filled with sole crude material, the crude material can be simply supplemented, and the existing facility and devices can be utilized as they are except that the crude material distributor and the separator 20 are associated, and therefore the cost of the facility is low.

Further, the distributor is composed by clamping a plurality of plates put one on another. Therefore, the distributor can be readily disassembled and assembled. After disassembled, the holes in the plates can be simply cleaned to provide excellent operability.

Figure 3:
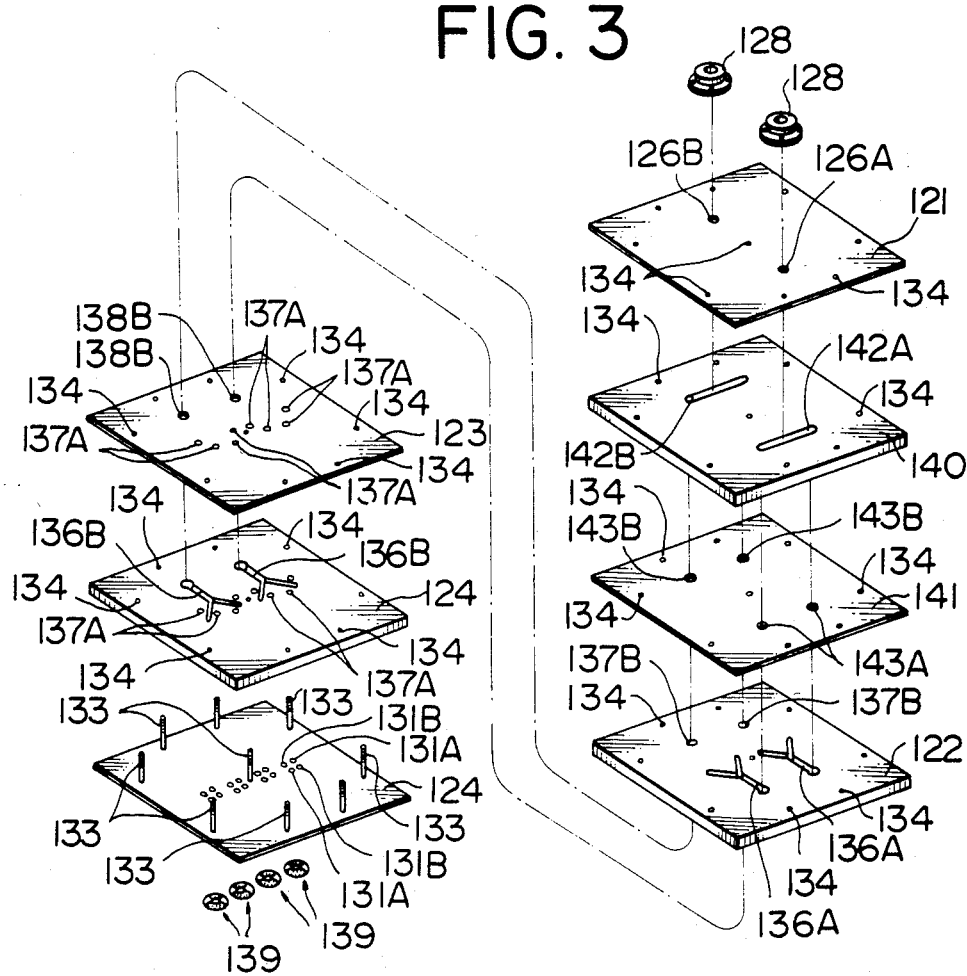
FIG. 3 is an exploded perspective view of a modification of the embodiment shown in FIG. 1.

FIG. 3 shows another construction of the crude material distributor. Crude materials A, B are fed through this distributor to four cutter devices (not shown) from two crude material tanks (not shown) in order that the crude materials are formed in the same manner as abovementioned. The members having the substantially similar construction except the numbers of the holes and openings are designated by corresponding numerals added with 100 and detailed description of these members will be omitted.

In this construction, a combination of an initial distributing plate 140 and an initial shielding plate 141 is employed between the upper horizontal plate 121 and the upper crude material distributing plate 122 so as to increase the number of the distributing passages from the upper opening 126A (or 126B). The opening 126A in the plate 121 faces the center of a slender hole 142A in the initial distributing plate 140, and each of the both ends of the hole 142A faces the end of the leg of one of two Y-shaped slender holes 136A in the upper crude material distributing plate 122 through a hole 143A in the shielding plate 141. Further, as to another upper opening 126B, each of the both ends of a slender hole 142B in the plate 140 faces similarly the end of the leg of one of two Y-shaped slender holes 136B in the lower crude material distributing plate 124 through holes 143B, 137B, 138B.

According to this construction, four crude material masses indicated by numeral 139 are formed simultaneously by using two crude material tanks, thereby a mass production can be efficiently carried out.

The present invention is not limited to the particular embodiments described above. For example, the holes in the distributing plates may be formed in other shape, and three or more crude materials may be led to the cutter device for one ring-shaped crude material mass. Further, the number of the longitudinal passages in the cutter device is not limited to four. For example, two to four or more longitudinal passages may be formed by a separator. Moreover, the distributing plates may be punched at the unnecessary portions for reducing the weight. In addition, the crude material tanks may not be directly pressurized.

For example, a tank with the top opened may be employed, said tank having at its outputting hole a rotary valve below which pressurized air may be fed.

According to the crude material forming machine of the present invention as described above, two or more portions of different tastes and/or different colors may be provided in one ring-shaped or circular shaped doughnut "Kamaboko" or the like, and therefore foodstuffs improved in appearance and/or taste may be obtained.

Further, the crude material distributor is adapted for mass production and may be earily disassembled and assembled for its cleaning.

Figure 4:
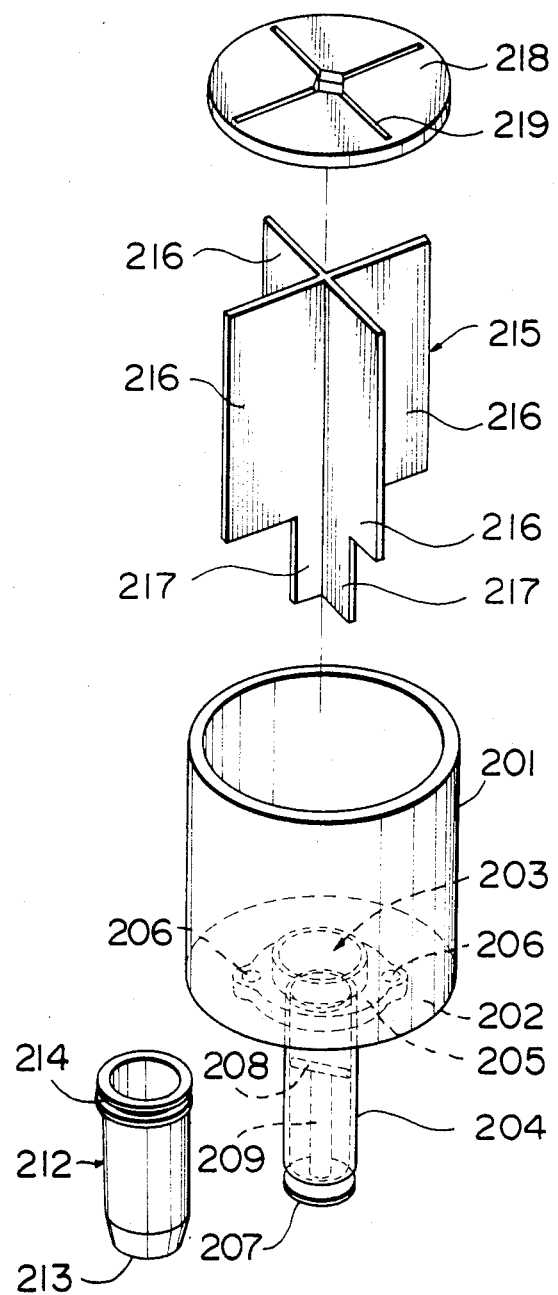
FIG. 4 is an exploded perspective view of another embodiment of the crude material forming machine.

FIG. 4 is an exploded view of a crude material forming machine according to another embodiment of the present invention, in which view numeral 201 designates a crude material tank formed as a bottomed round body, and a crude material outputting downward hole 203 is arranged at the center of the bottom plate 202 of the tank 201. The upper opening of the tank 201 is able to be sealed by a detachable cover (not shown), and air of predetermined pressure can be introduced in the tank 201 through an air pipe (not shown) connected to the cover.

Numeral 204 designates a guide cylinder opened at the upper and lower ends and mounted on the lower surface of the bottom plate 202 of the tank 201. The hole 203 of the tank 201 and the upper end opening of the cylinder 204 are aligned with and fixed to each other by clamping with bolts extending through mounting holes 206 formed in a flange 205 at the upper end of the cylinder 204.

Numeral 207 designates a disc arranged to keep a predetermined interval to the lower end opening of the cylinder 204. A lateral rod 208 is laterally fixed to the cylinder 204 at the intermediate position between the upper and lower ends of the cylinder 204, and a bolt 209 is suspended downward along the axial center of the cylinder 204 from the center of the rod 8.

The disc 207 is engaged with the threaded lower end portion of the bolt 209, and thus supported through the rod 208 and the bolt 209 by the cylinder. Numeral 211 designates a clamping nut.

Numeral 212 designates a cutter sleeve vertically movably mounted on the cylinder 204. When the sleeve 212 is moved downwards, the lower end edge 213 of this sleeve 212 is engaged with the outer peripheral edge of the disc 207 to cut off the crude material deflected and outputted radially outward along the upper surface of the disc. Numeral 214 designates a peripheral groove formed on the upper outer periphery of the sleeve 212, and engaged with a cam of drive means (not shown) for dring vertically the sleeve.

The above guide cylinder 204, the disc 207 and the sleeve 212 construct a cutter device.

In the crude material forming machine of this embodiment, in addition to the above-described members, a separator designated by numeral 215 in FIG. 4 is arranged in the interior of the tank 201 and the cylinder 204. More specifically, the separator 215 is formed as a combination of partition plates coupled so as to form a cross shape as seen from above, the upper wide portion 216 of the partition plate is engaged substantially without interval to the inner surface of the tank 201, and the lower narrow portion 217 of the partition plate is also engaged substantially without interval to the inner surface of the guide cylinder 204. The height of the narrow portion 217 is so determined that the rod 208 is substantially engaged with the lower end of the narrow portion 217 when the lower end of the wide portion 216 is engaged with the bottom of the tank 201.

When the separator 215 thus constructed is inserted into the interior of the tank and the guide cylinder, the tank 1 and the upper half of the cylinder 204 are partitioned into four sections of quarter-curcular shape, and the crude material filled in one section is fed to the lower half of the cylinder 204 without mixing with the crude material of different type filled in the other section. In this embodiment, separator means are not provided in the lower half of the cylinder 204, but since the flow of the crude material is straightened in the axial direction in the cylinder, the crude materials led from the adjacent sections are not substantially mixed with each other in this portion.

Therefore, when the crude materials deflected and led radially outward along the disc 207 positioned below the cylinder 204 are cut off by the cutter sleeve 212, the ring-shaped mass composed of crude materials of different types is obtained, and the mass is divided into four portions continued to each other in the circumferential direction. For example, when the crude materials are represented by colors, the ring having white, black, white and black portions continued circumferentially, or the ring having different four colors continued circumferentially is obtained.

Numeral 218 in FIG. 4 designates an inner cover used for pressurizing uniformly the upper surfaces of the crude materials in the respective sections, and a cross shaped opening 219 through which the separators 215 extends is formed in the inner cover 218.

Figure 5:
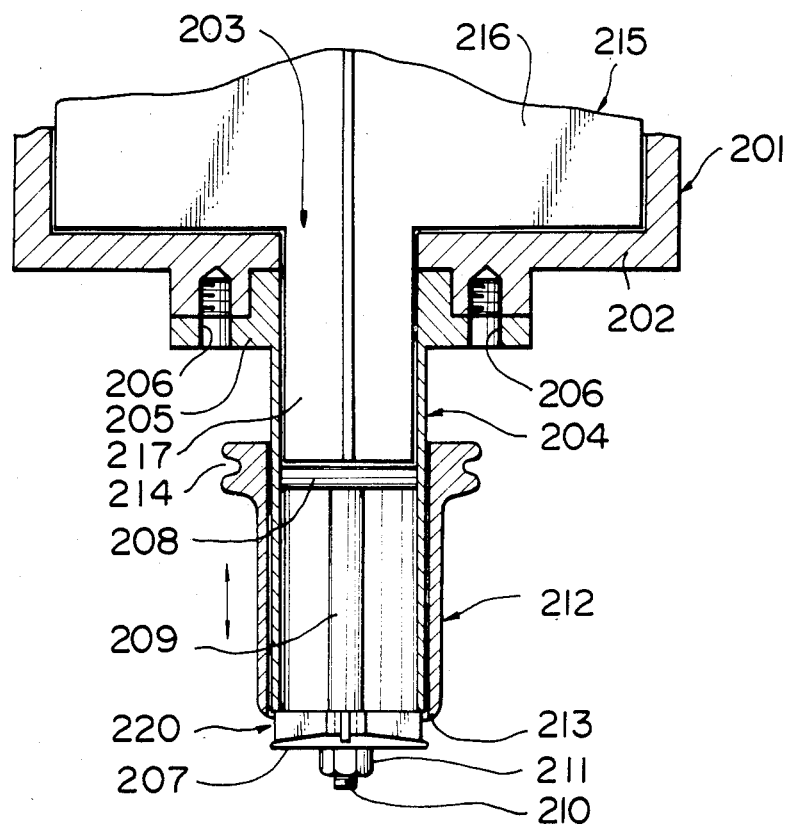
FIG. 5 shows a sectional view and a plan view of the cutter device in the embodiment shown in FIG. 4.
Figure 5:
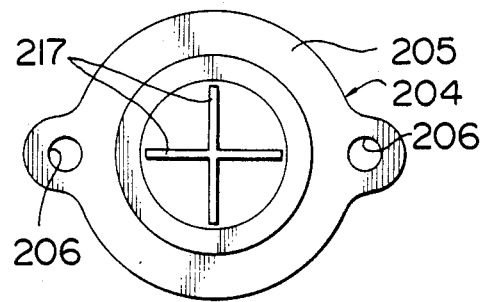

FIG. 5 shows a modification of the cutter device. This modification is substantially the same as the embodiment shown in FIG. 4 except that an auxiliary separator 220 is arranged on the upper surface of the disc 207.

Figure 6:
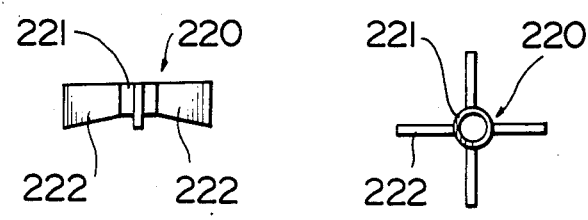
FIG. 6 shows a front view and a plan view of an auxiliary separator.

This auxiliary separator 220 is, as shown in FIG. 6, composed of a short cylinder 221 engaged fixedly with the lower end of the disc supporting bolt 219, and four blades 222 extending radially outward from the cylinder 221. The blades 222 are brought into alignment with the partition plates of the main separator 215.

Figure 7:
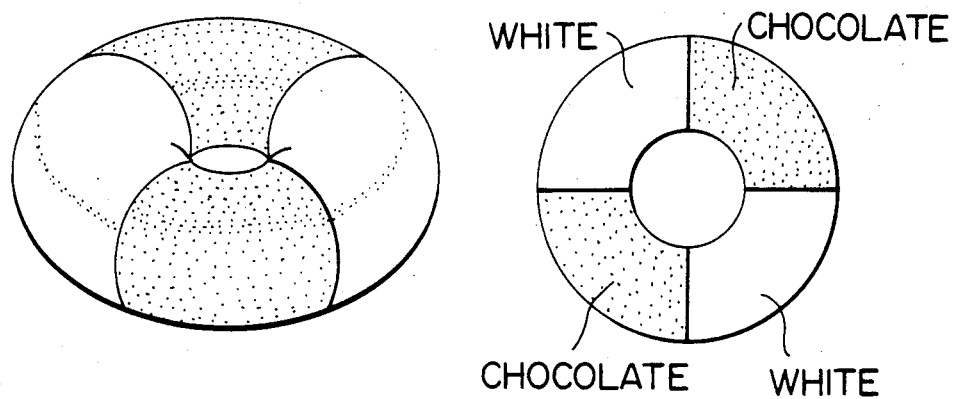
FIG. 7 shows a perspective view and plan view of a ring-shaped doughnut produced by using the machine according to the invention.
Figure 8:
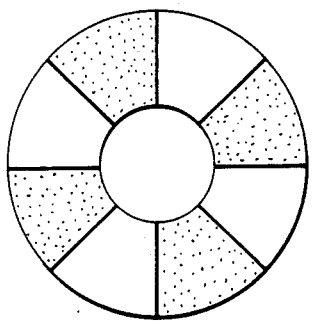
FIG. 8 shows a plan of another doughnut.

FIG. 7 shows an example of the ring-shaped doughnut produced by using the crude material forming machine according to the invention. This doughnut is composed of two white portions with butter taste and two brown portions with chocolate taste. FIG. 8 shows a doughnut divided into eight portions.

The crude material forming machine show in FIGS. 4–6 is not adapted to mass production, but simpler in construction and therefore cheaper than that shown in FIGS. 1–3.

What is claimed is:

1. A machine for forming viscous fluid crude material such as dough or fish-paste into a ring shape or the like, comprising a cutter device including a nozzle guide cylinder having upper and lower openings, said cutter device comprising a disc centrally positioned below the lower opening and a cutter sleeve slidable on the guide cylinder, a guide passage between the upper and lower openings for guiding crude material introduced forcely through the upper opening so as to be extruded from the lower opening, and cutter means arranged at the lower opening for cutting off the extruded crude material thereat, said passage being partitioned at least in its upper portion into a plurality of annular sector-shaped sections by means of a separator, at least two crude material tanks, each provided with a lower end opening, and a distributor including a plurality of distributing passages, each of said distributing passages causing one of the lower end openings of the tanks to communicate with selected one or ones of the upper ends of the annular sector-shaped sections, the distributor comprising an upper plate having a plurality of openings opposed to the lower end openings of the tanks, a lower plate having a plurality of openings opposed to the upper ends of the sector-shaped sections, and a passage forming unit between the upper and lower plates, said unit having a plurality of holes, each of the openings in the upper plate being connected to selected one or ones of the openings in the lower plate through selected one or ones of the holes in the unit.

* * * * *